United States Patent
Momozono et al.

(10) Patent No.: US 9,859,026 B2
(45) Date of Patent: Jan. 2, 2018

(54) AUSTENITIC ALLOY TUBE

(71) Applicant: NIPPON STEEL & SUMITOMO METAL CORPORATION, Chiyoda-ku, Tokyo (JP)

(72) Inventors: Yumi Momozono, Tokyo (JP); Mitsuharu Yonemura, Tokyo (JP); Yasuhiro Masaki, Tokyo (JP); Manabu Kanzaki, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 410 days.

(21) Appl. No.: 14/408,483

(22) PCT Filed: Jun. 19, 2013

(86) PCT No.: PCT/JP2013/066817
§ 371 (c)(1),
(2) Date: Dec. 16, 2014

(87) PCT Pub. No.: WO2013/191202
PCT Pub. Date: Dec. 27, 2013

(65) Prior Publication Data
US 2015/0194227 A1    Jul. 9, 2015

(30) Foreign Application Priority Data

Jun. 20, 2012   (JP) ................. 2012-138658

(51) Int. Cl.
| | | |
|---|---|---|
| *G21C 15/02* | (2006.01) | |
| *C21D 8/10* | (2006.01) | |
| *C22C 19/05* | (2006.01) | |
| *C22C 38/00* | (2006.01) | |
| *C22F 1/00* | (2006.01) | |
| *C22F 1/02* | (2006.01) | |
| *C22F 1/10* | (2006.01) | |
| *G21D 1/00* | (2006.01) | |
| *C22C 38/02* | (2006.01) | |
| *C22C 38/04* | (2006.01) | |
| *C22C 38/06* | (2006.01) | |
| *C22C 38/42* | (2006.01) | |
| *C22C 38/50* | (2006.01) | |
| *C21D 1/26* | (2006.01) | |
| *C21D 6/00* | (2006.01) | |
| *C21D 9/08* | (2006.01) | |
| *C22C 30/00* | (2006.01) | |
| *C22C 38/40* | (2006.01) | |

(52) U.S. Cl.
CPC .............. *G21C 15/02* (2013.01); *C21D 1/26* (2013.01); *C21D 6/004* (2013.01); *C21D 8/10* (2013.01); *C21D 8/105* (2013.01); *C21D 9/08* (2013.01); *C22C 19/05* (2013.01); *C22C 19/058* (2013.01); *C22C 30/00* (2013.01); *C22C 38/00* (2013.01); *C22C 38/02* (2013.01); *C22C 38/04* (2013.01); *C22C 38/06* (2013.01); *C22C 38/40* (2013.01); *C22C 38/42* (2013.01); *C22C 38/50* (2013.01); *C22F 1/00* (2013.01); *C22F 1/02* (2013.01); *C22F 1/10* (2013.01); *G21D 1/006* (2013.01); *Y02E 30/40* (2013.01)

(58) Field of Classification Search
CPC ........ G21C 15/02; G21D 1/006; C22C 19/05; C22C 19/058; C22C 30/00; C22C 38/00; C22C 38/02; C22C 38/04; C22C 38/06; C22C 38/40; C22C 38/42; C22C 38/50; C21D 1/26; C21D 6/004; C21D 8/10; C21D 8/105; C21D 9/08; C22F 1/00; C22F 1/02; C22F 1/10; Y02E 30/40
See application file for complete search history.

(56) References Cited

U.S. PATENT DOCUMENTS

| | | | |
|---|---|---|---|
| 2011/0056590 A1* | 3/2011 | Kanzaki | ............... C22C 19/058 148/428 |
| 2013/0206272 A1 | 8/2013 | Masaki et al. | |

FOREIGN PATENT DOCUMENTS

| | | |
|---|---|---|
| CA | 2648711 A1 | 10/2007 |
| CA | 2723522 A1 | 11/2009 |
| CN | 101851714 | 10/2010 |
| CN | 102181752 | 9/2011 |

(Continued)

OTHER PUBLICATIONS

Kanzaki et al., English machine translation of JP 2005-015899, Jan. 2005, pp. 1-16.*

(Continued)

*Primary Examiner* — Roy King
*Assistant Examiner* — Caitlin Kiechle
(74) *Attorney, Agent, or Firm* — Birch, Stewart, Kolasch & Birch, LLP

(57) ABSTRACT

An austenitic alloy tube subjected to a cold working and an annealing heat treatment contains C: 0.01% to 0.15%, Cr: 10.0% to 40.0%, Ni: 8.0% to 80.0%, in mass %, and has a metallographic structure satisfying the following Expressions (i) to (iii).

$$R \le f1 \tag{i}$$

$$R = I_{220}/I_{111} \tag{ii}$$

$$f1 = 0.28 \times (F_{111}^{8.0}/(F_{111}^{8.0} + 0.35^{8.0})) \tag{iii}$$

Where, in the above Expressions, R is a ratio of an integrated intensity of {220} to an integrated intensity of {111} on a surface layer which is measured by a grazing incidence X-ray diffraction method, $I_{220}$ is the integrated intensity of {220}, $I_{111}$ is the integrated intensity of {111}, and $F_{111}$ is full width of half maximum of {111} on the surface layer which is measured by the grazing incidence X-ray diffraction method.

2 Claims, 2 Drawing Sheets

(56) References Cited

FOREIGN PATENT DOCUMENTS

| | | |
|---|---|---|
| EP | 1715071 | 10/2006 |
| EP | 2275583 | 1/2011 |
| JP | 62-218546 | 9/1987 |
| JP | 64-055366 | 3/1989 |
| JP | 08-029571 | 2/1996 |
| JP | 11080905 | 3/1999 |
| JP | 2002-121630 | 4/2002 |
| JP | 2002-322553 | 11/2002 |
| JP | 2004-218076 | 8/2004 |
| JP | 2004339576 | 12/2004 |
| JP | 2005-015899 | 1/2005 |
| JP | 2005023353 | 1/2005 |
| JP | 2006-111902 | 4/2006 |
| JP | 2009-161802 | 7/2009 |
| JP | 2010-202966 | 9/2010 |
| WO | WO 2009/139387 | 11/2009 |
| WO | WO 2012/026344 | 3/2012 |

OTHER PUBLICATIONS

International Search Report dated Aug. 6, 2013 issued in corresponding PCT Application No. PCT/JP2013/066817 [with English Translation].
Search Report dated Feb. 9, 2016 issued in corresponding European Application No. 13806115.5.
Canadian Office Action for Canadian Application No. 2,876,847, dated Jun. 9, 2016.
Office Action dated Nov. 16, 2015 issued in corresponding Chinese Application No. 201380032142.X.

\* cited by examiner

AUSTENITIC ALLOY TUBE

TECHNICAL FIELD OF THE INVENTION

This application is a national stage application of International Application No. PCT/JP2013/066817, filed Jun. 19, 2013, which claims priority to Japanese Patent Application No. 2012-138658, filed on Jun. 20, 2012, each of which is incorporated by reference in its entirety.

The present invention relates to an austenitic alloy tube, and in particular, to an austenitic alloy tube which has high general corrosion resistance in high temperature water such as a nuclear power plant.

RELATED ART

As a heat transfer tube for a steam generator used for a nuclear power plant (hereinafter, simply referred to as a "SG tube"), a chromium-containing austenitic alloy such as an Alloy 600 and an Alloy 690 is used. This is because such an alloy has high corrosion resistance in high temperature water.

Such a material is used in an environment of high temperature water around 300° C. (in high temperature water) which is a reactor water environment of a nuclear reactor, for several years to several tens of years. The chromium-containing austenitic alloy which is generally used as the SG tube for a nuclear power plant, contains a large amount of Ni, and has high corrosion resistance, and thus the corrosion rate is low, but a metal component such as a trace amount of Ni is released from a base metal during long term use.

Ni released from the SG tube is transported to a reactor core and is irradiated with neutrons in the vicinity of fuels while circulating reactor water. When Ni is irradiated with the neutrons, Ni is converted into radioactive Co by a nuclear reaction. The radioactive Co has an extremely long half-life, and thus radioactive rays are continuously emitted for a long time. Therefore, when the amount of Ni release from the SG tube is large, it is impossible to begin a periodic inspection before the amount of emitted radioactive rays is reduced to a suitable value. For this reason, the period of periodic inspection is extended, and thus an economical loss occurs.

In order to use a light water reactor for a long time, it is critically important to reduce the amount of Ni release. For this reason, Ni in the SG tube as the alloy element has been prevented from being released by improving the corrosion resistance on a material side and by controlling the water quality of nuclear reactor water.

In Patent Document 1, a method of annealing a Ni-based alloy heat transfer tube at a temperature range from 400° C. to 750° C. in a vacuum atmosphere of $10^{-2}$ to $10^{-4}$ Torr, in order to form an oxide film mainly containing chromium oxide, and thus improve the general corrosion resistance, is disclosed.

In Patent Document 2, a manufacturing method of a nuclear power plant material in which an age hardening treatment in an oxidation atmosphere under $10^{-3}$ Torr to atmospheric pressure air after a solution treatment, and a heat treatment serving as at least a part of an oxide film forming process are performed with respect to a Ni-based precipitation-strengthening alloy, is disclosed.

In Patent Document 3, a manufacturing method of a Ni-based alloy product in which a Ni-based alloy product is subjected to a heat treatment in a hydrogen atmosphere or in a mixed atmosphere of hydrogen and argon where a dew point is −60° C. to +20° C., is disclosed.

In Patent Document 4, a method in which an alloy work piece which contains nickel and chromium is exposed to a gas mixture of water vapor and at least one type of non-oxidizing gases and a chromium rich layer is formed on a surface of the alloy work piece, is disclosed.

In Patent Document 5, a manufacturing method of treating a Cr-containing nickel-based alloy tube in an atmosphere composed of non-oxidizing gases containing oxidizing gases, in order to form a chromium oxide film having a predetermined thickness on an inner surface of the tube, is disclosed.

In Patent Document 6, a manufacturing method of a Ni-based alloy in which a Ni-based alloy is heated in an atmosphere including carbon dioxide gases and an oxide film including chromium oxide is formed on a surface of the Ni-based alloy, is disclosed.

In Patent Document 7, a nickel-based alloy manufacturing method of increasing a low angle boundary ratio in a crystal grain boundary, in order to improve SCC resistance, is disclosed.

In Patent Document 8, a Ni—Cr alloy tube in which by applying great even lattice strain to an outermost surface layer, corrosion resistance is improved, is disclosed.

PRIOR ART DOCUMENT

Patent Document

[Patent Document 1] Japanese Unexamined Patent Application, First Publication No. S64-55366
[Patent Document 2] Japanese Unexamined Patent Application, First Publication No. H8-29571
[Patent Document 3] Japanese Unexamined Patent Application, First Publication No. 2002-121630
[Patent Document 4] Japanese Unexamined Patent Application, First Publication No. 2002-322553
[Patent Document 5] PCT International Publication No. WO2012/026344
[Patent Document 6] Japanese Unexamined Patent Application, First Publication No. 2006-111902
[Patent Document 7] Japanese Unexamined Patent Application, First Publication No. 2004-218076
[Patent Document 8] PCT International Publication No. WO2009/139387

DISCLOSURE OF THE INVENTION

Problems to be Solved by the Invention

As disclosed in Patent Documents 1 to 6 described above, in a technology for forming a protective film on a surface of an alloy, excellent preventive effects with respect to Ni release are obtained when the film is maintained in a fine state. However, when the film is separated during use in an actual plant, Ni release resistance is deteriorated, and may therefore have adverse effects on the water quality in a furnace.

In the manufacturing method of the nickel-based alloy disclosed in Patent Document 7, in order to increase the low angle boundary ratio in the crystal grain boundary, reduction of area in final cold working and the final solution heat treatment temperature are defined, and the degree of final cold working is set to be the highest among the cold working. However, a relationship between the degree of final cold working and reduction of area in intermediate cold working or between the degree of final cold working and an intermediate solution heat treatment temperature is not specifically disclosed. In addition, the amount of Ni release is not considered.

In the method disclosed in Patent Document 8, mainly, the corrosion resistance is improved by the even lattice strain applied by elastic deformation. However, a relationship between non-uniform strain such as a dislocation, and corrosion resistance is not considered.

The present invention is to solve such problems of the related art, and to provide an austenitic alloy tube in which the corrosion resistance, particularly the general corrosion resistance, is dramatically improved.

Means for Solving the Problem

Through the intensive study of a method in which release of a metal component such as Ni is prevented by improving the corrosion resistance (the general corrosion resistance) of an austenitic alloy-tube, an influence of a material surface structure on the general corrosion resistance has been investigated. As a result, the following findings have been obtained.

(a) A relationship between a plane orientation of a crystal on a surface layer and the corrosion resistance (the general corrosion resistance) was investigated with respect to an austenitic alloy such as Alloy 690 which had a face-centered cubic structure (a fcc structure). As a result, it was found that in a single crystal material sample having the plane orientation of {110}, the amount of Ni release was remarkably reduced in a Ni release test described later, compared to a single crystal material sample having the plane orientation of {100} or {111}.

(b) An anodic polarization resistance measurement was performed with respect to the single crystal material sample having the plane orientation of {100}, {110}, and {111} described above. As a result, in the sample having the plane orientation of {110}, anodic polarization resistance was high, compared to other samples. It is considered that when anodic polarization was high, reaction resistance at the time that metal is released through a passive film becomes high, and thus the amount of a released metal component is reduced.

(c) According to the reasons described above, when preferred crystal orientation of {110} (a fraction of the {110} plane with respect to the alloy surface) in the structure of the surface layer of the material (the alloy) increases, it is possible to improve the general corrosion resistance of the alloy. However, it is difficult to directly evaluate the preferred crystal orientation of {110}. Therefore, through intensive consideration, the inventors of the present invention have found that R which is an integrated intensity ratio of {220} to {111} on the surface layer (a ratio of an integrated intensity of {220} $I_{220}$ to an integrated intensity of {111} $I_{111}$: $I_{220}/I_{111}$) measured by a grazing incidence X-ray diffraction method is effectively used as the preferred crystal orientation of {110}. Furthermore, in a measurement by using X-ray diffraction, a diffraction peak of {110} does not appear, but the diffraction peak of {220} which is in parallel with {110} appears. For this reason, the following description is described by {220} instead of {110}, and the preferred crystal orientation of {110} is referred to as the preferred crystal orientation of {220}.

(d) In the grazing incidence X-ray diffraction, the integrated intensity ratio of {220} to {111} and the preferred crystal orientation of a crystal lattice plane have a negative correlation. That is, when R which is the ratio of the integrated intensity of {220} ($I_{220}$) to the integrated intensity of {111} ($I_{111}$) is set to a preferred crystal orientation parameter, the preferred crystal orientation of {220} increases as the value of R decreases.

(e) It is considered that a diffusion site of Cr increases as an amount of intragranular dislocation becomes larger, and the passive film is prompted to be formed, and thus the corrosion resistance (the general corrosion resistance) is improved. For this reason, according to the preferred crystal orientation described above, a structure in which a suitable dislocation density is included in grains is configured, and thus more excellent general corrosion resistance can be obtained.

(f) Even when the preferred crystal orientation of {220} decreases, if many dislocations are introduced into the grains, Cr diffusion through dislocation can be rapidly and evenly performed, and thus it is possible to quickly and uniformly form the passive film which suppresses Ni release.

(g) As an index of dislocation density described above, the inventors of the present invention have focused on a full width of half maximum of {111}, $F_{111}$ on the surface layer measured by the grazing incidence X-ray diffraction method. In a focusing method of X-ray diffraction, there is a relationship between the full width of half maximum and dislocation density as is well-known. The similar qualitative tendency is observed in the case of grazing incidence X-ray diffraction method. Therefore, the full width of half maximum $F_{111}$ on the surface layer measured by the grazing incidence X-ray diffraction method includes information of dislocation density, and the full width of half maximum tends to be larger when dislocation density increases.

(h) By obtaining a metallographic structure which satisfies the following Expressions (i) to (iii) described later between R which is a parameter of the preferred crystal orientation of {220} and the full width of half maximum of {111} as the index of dislocation density, it is possible to give high general corrosion resistance to the alloy.

$$R \leq f1 \qquad (i)$$

$$R = I_{220}/I_{111} \qquad (ii)$$

$$f1 = 0.28 \times (F_{111}^{8.0}/(F_{111}^{8.0} + 0.35^{8.0})) \qquad (iii)$$

Where each symbol in Expressions (i) to (iii) described above represents as follows.

R: a ratio of the integrated intensity of {220} to the integrated intensity of {111} on the surface layer measured by the grazing incidence X-ray diffraction method $I_{220}$: the integrated intensity of {220}

$I_{111}$: the integrated intensity of {111}

$F_{111}$: the full width of half maximum of {111} on the surface layer measured by the grazing incidence X-ray diffraction method The present invention is made on the basis of the findings described above, and related to an austenitic alloy tube indicated in (1) or (2) described below.

(1) That is, an austenitic alloy tube according to one aspect of the present invention which is subjected to a cold working and an annealing heat treatment, contains C: 0.01% to 0.15%; Cr: 10.0% to 40.0%; and Ni: 8.0% to 80.0%, in mass %, and has a metallographic structure satisfying the following Expressions (i) to (iii).

$$R \leq f1 \qquad (i)$$

$$R = I_{220}/I_{111} \qquad (ii)$$

$$f1 = 0.28 \times (F_{111}^{8.0}/(F_{111}^{8.0} + 0.35^{8.0})) \qquad (iii)$$

Where, in the above Expressions, R is a ratio of an integrated intensity of {220} to an integrated intensity of {111} on a surface layer which is measured by a grazing incidence X-ray diffraction method, $I_{220}$ is the integrated intensity of {220}, $I_{111}$ is the integrated intensity of {111}, and $F_{111}$ is a full width of half maximum of {111} on the surface layer which is measured by the grazing incidence X-ray diffraction method.

(2) The austenitic alloy tube according to (1) may be used as a nuclear power plant material.

Effects of the Invention

According to the present invention, an austenitic alloy tube with excellent general corrosion resistance in which release of a metal component such as Ni is extremely reduced even in high temperature water is obtained. Therefore, the austenitic alloy tube according to the present invention is suitable for a nuclear power plant material such as an SG tube.

EMBODIMENTS OF THE INVENTION

Figure 1:
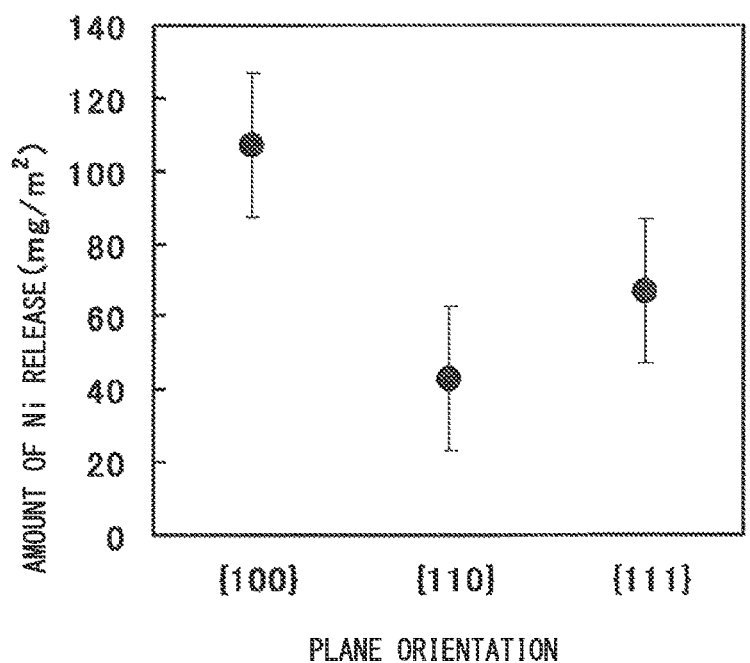
FIG. 1 is a diagram showing a relationship between a plane orientation of a sample and an amount of Ni release by a Ni release test.

Hereinafter, an austenitic alloy tube according to one embodiment of the present invention will be described.

1. Chemical Composition

An austenitic alloy (hereinafter, may be simply referred to as an "alloy") used for the austenitic alloy tube according to this embodiment, includes a chemical composition containing C: 0.01% to 0.15% or less, Cr: 10.0% to 40.0%, and Ni: 8.0% to 80.0% in mass %.

Further, it is preferable that the chemical composition contain Si: 1.00% or less, Mn: 2.00% or less, P: 0.030% or less, S: 0.030% or less, Ti: 0.5% or less, Cu: 0.6% or less, Al: 0.5% or less, and N: 0.20% or less, and the remainder contain Fe and impurities, in mass %.

Here, the "impurities" are components which are mixed from raw materials such as ore and scraps, and various factors of a manufacturing procedure at the time of industrially manufacturing the alloy, and are allowed within a range in which adverse effects are not applied to the present invention.

Reasons for limiting each element are as follows. Furthermore, in the following description, "%" of a content of each of the elements indicates "mass %".

C: 0.01% to 0.15%

C is an element having effects for increasing grain boundary strength of the alloy. In order to obtain the effects described above, a C content is greater than or equal to 0.01%. However, when the C content exceeds 0.15%, stress corrosion cracking resistance and workability are deteriorated. Therefore, the C content is 0.01% to 0.15%. Furthermore, the desired upper limit of the C content is 0.06%.

Cr: 10.0% to 40.0%

Cr is an element necessary for creating an oxide film including chromium oxide, and for improving corrosion resistance. In order to create such an oxide film on an alloy surface, it is necessary that a Cr content is greater than or equal to 10.0%. However, when the Cr content exceeds 40.0%, the workability is deteriorated. Therefore, the Cr content is 10.0 to 40.0%.

Ni: 8.0% to 80.0%

Ni is an element necessary for securing the corrosion resistance of the austenitic alloy, and in order to obtain the effects, it is necessary that a Ni content is greater than or equal to 8.0%. Preferably, the Ni content is greater than or equal to 45.0%. On the other hand, since Ni is an expensive element, required minimum Ni may be contained according to a use, and it is preferable that an upper limit of the Ni content be 80.0%.

Si: 1.00% or less

Si is an element used as a deoxidizing material at the time of performing smelting, and remains in the alloy as the impurities. When a Si content is excessive, cleanliness of the alloy decreases, and thus it is preferable that the Si content be less than or equal to 1.00%. It is more preferable that the Si content be less than or equal to 0.50%. In order to obtain the deoxidizing effects described above, it is preferable that the Si content be greater than or equal to 0.05%.

Mn: 2.00% or less

Mn is an element useful for fixing S as MnS, and for secure hot workability. Mn may not be contained, but in order to obtain the effects described above, it is preferable that a Mn content be greater than or equal to 0.05%. However, when the Mn content is excessive, the corrosion resistance of the alloy may decrease. For this reason, it is preferable that the Mn content be less than or equal to 2.00%.

P: 0.030% or less

P is an element existing in the alloy as the impurities. It is preferable that the P content is decreased, and when the P content exceeds 0.030%, the corrosion resistance is remarkably decreased, and thus that the P content is less than or equal to 0.030%.

S: 0.030% or less

S is an element existing in the alloy as the impurities. It is preferable that the S content is decreased, and when the S content exceeds 0.030%, the corrosion resistance is remarkably decreased, and thus that the S content is less than or equal to 0.030%.

Ti: 0.5% or less

Ti is an element useful for improving the workability of the alloy, and for suppressing the crystal grain growth at the time of performing welding. Ti may not necessarily be contained, but in order to obtain the effects described above, it is preferable that the Ti content be greater than or equal to 0.1%. However, when the Ti content exceeds 0.5%, cleanliness of the alloy is deteriorated. For this reason, it is preferable that the Ti content be 0.1% to 0.5%. More preferably, the upper limit of the Ti content is 0.4%.

Cu: 0.6% or less

Cu is an element existing in the alloy as the impurities. When the Cu content exceeds 0.6%, the corrosion resistance of the alloy decreases, and thus the Cu content is less than or equal to 0.6%.

Al: 0.5% or less

Al is used as the deoxidizing material at the time of performing steelmaking, and remains in the alloy as an impurity. The remaining Al is an oxide-based inclusion in the alloy, and the cleanliness of the alloy is deteriorated, and thus the corrosion resistance and mechanical property of the alloy is adversely affected. For this reason, an Al content is less than or equal to 0.5%.

N: 0.20% or less

N may not be contained, but in the austenitic alloy according to this embodiment, in general, approximately 0.01% of N is contained as the impurities. In addition, when N is less than or equal to 0.20%, N is an element which is able to improve strength without deteriorating the corrosion resistance. When the N content exceeds 0.20%, the corrosion resistance may be decreased, and thus it is preferable that the N content be less than or equal to 0.20%.

As the austenitic alloy described above, an alloy having the following 2 types of compositions is exemplified.

(a) An austenitic alloy containing C: 0.15% or less, Si: 1.00% or less, Mn: 2.00% or less, P: 0.030% or less, S: 0.030% or less, Cr: 14.0% to 17.0%, Ni: 70% to 80%, Fe: 6.0% to 10.0%, Ti: 0.5% or less, Cu: 0.5% or less, and Al: 0.5% or less, and the remainder composed of impurities.

(b) An austenitic alloy containing C: 0.06% or less, Si: 1.00% or less, Mn: 2.00% or less, P: 0.030% or less, S: 0.030% or less, Cr: 27.0% to 31.0%, Ni: 55% to 65%, Fe: 7.0% to 11.0%, Ti: 0.5% or less, Cu: 0.5% or less, and Al: 0.5% or less, and the remainder composed of impurities.

The alloy of (a) described above contains 14.0% to 17.0% of Cr and 70% to 80% of Ni, and thus the corrosion resistance is excellent particularly in an environment containing chloride. In this alloy, from the viewpoint of a balance between the Ni content and the Cr content, it is preferable that the Fe content be 6.0% to 10.0%.

The alloy of (b) described above contains 27.0% to 31.0% of Cr and 55% to 65% of Ni, and thus the corrosion resistance thereof is excellent even in an environment of pure water and alkali at high temperature, in addition to the environment containing chloride. In this alloy, from the viewpoint of a balance between the Ni content and the Cr content, it is preferable that the Fe content be 7.0% to 11.0%.

2. Metallographic Structure

The austenitic alloy tube according to this embodiment has a metallographic structure satisfying Expressions (i) to (iii).

$$R \leq f1 \qquad \text{(i)}$$

$$R = I_{220}/I_{111} \qquad \text{(ii)}$$

$$f1 = 0.28 \times (F_{111}^{8.0}/(F_{111}^{8.0} + 0.35^{8.0})) \qquad \text{(iii)}$$

Where a meaning of each symbol in Expressions (i) to (iii) described above is as follows.

R: the ratio of an integrated intensity of {220} to an integrated intensity of {111} on a surface layer measured by a grazing incidence X-ray diffraction method $I_{220}$: the integrated intensity of {220}

$I_{111}$: the integrated intensity of {111}

$F_{111}$: the full width of half maximum of {111} on the surface layer measured by the grazing incidence X-ray diffraction method The surface layer described above represents, specifically, a layer from the surface of a material (the alloy) to a depth of at least 200 nm. When the depth is calculated from an X-ray absorption coefficient of Ni right after being exposed to the high temperature water environment, the structure of the layer from the surface of the material to the depth at or below 200 nm is affected by a corrosion reaction. For this reason, in order to improve the corrosion resistance of the austenitic alloy-tube, it is important to manage the structure in such a region.

As described above, by controlling the preferred crystal orientation of {220} on the surface layer and dislocation density, it is possible to improve the general corrosion resistance of the alloy. It is necessary that the preferred crystal orientation parameter R described above be less than or equal to a value of f1 which is a function of $F_{111}$. In addition, it is preferable that R is less than or equal to the value of f2 represented by Expression (iv), and it is more preferable that R is less than or equal to a value of f3 represented by Expression (v).

$$f2 = 0.26 \times (F_{111}^{9.9}/(F_{111}^{9.9} + 0.375^{9.9})) \qquad \text{(iv)}$$

$$f3 = 0.235 \times (F_{111}^{12.0}/(F_{111}^{12.0} + 0.4^{12.0})) \qquad \text{(v)}$$

3. Manufacturing Method

A method for controlling the preferred crystal orientation of {220} on the surface layer of the alloy and dislocation density is not particularly limited, and corrosion resistance improving effects are obtained insofar as the austenitic alloy having the components and the metallographic structure described above is obtained. For example, it is possible to perform control by adjusting the conditions of the cold working and the heat treatment as follows.

Specifically, cold rolling is performed with respect to the alloy containing the chemical components described above at high reduction of area of 65% or greater, and heat treatment conditions (heating temperature and heating time) in a subsequent annealing heat treatment are suitably controlled, and thus it is possible to control dislocation density and to improve the preferred crystal orientation of {220} on a surface of the austenitic alloy tube. In addition, in subsequent drawing, reduction of area is set to be less than or equal to 50%, and the heat treatment conditions in the subsequent annealing heat treatment are suitably controlled, and thus it is possible to further improve the preferred orientation. Furthermore, subsequently, straightening is performed by a straightener, and in the straightening, driving force by which grain growth is prompted is not applied, and thus the preferred crystal orientation is not considerably changed.

By performing the cold rolling at high reduction of area of 65% or greater, a non-uniform strain, that is, the dislocation, is introduced. Subsequently, by performing the annealing heat treatment, the crystal grain growth and rotation are generated according to recovery and recrystallization, and thus a texture, that is, a preferred crystal orientation of {220}, is formed. At this time, when reduction of area is less than 65% in the cold rolling, the dislocation to be introduced is insufficient, and thus the preferred crystal orientation of {220} may not be sufficiently increased. In addition, in the annealing heat treatment after the cold rolling, in order to sufficiently occur the recovery and the recrystallization, it is preferable that the heating temperature is 1000° C. to 1150° C., and the heating time is 0.1 to 40 hours.

In addition, by performing cold drawing after performing the cold rolling and the annealing heat treatment after the cold rolling, it is possible to improve dimensional accuracy of the austenitic alloy tube and to perform thinning. At this time, by performing the cold drawing at reduction of area of 50% or less which is a relatively low reduction of area, a surface condition is adjusted, and the structure extends in a drawing direction by compression stress between a die and the material, and thus the dislocation is suitably introduced. Subsequently, by performing the annealing heat treatment, the preferred crystal orientation of {220} is further improved according to the recovery of the dislocation and the recrystallization. In contrast, when reduction of area exceeds 50% in the cold drawing, a fracture of a formed grain regulation texture and a void or a crack due to introduction of the excessive dislocation occur, and thus effects for suppressing Ni release may be reduced. In addition, in the annealing heat treatment after the cold drawing, in order to sufficiently occur the recovery and the recrystallization, it is preferable that the heating temperature is 1000° C. to 1150° C., and the heating time is 0.1 to 40 hours.

Hereinafter, the present invention will be more specifically described according to examples, but the present invention is not limited to the examples.

Example 1

An austenitic alloy having chemical compositions of a steel type A in Table 1 was dissolved and cast in vacuum, and an ingot obtained therefor was worked to have a diameter of 7 mm×a length of 120 mm, and thus a single crystal material was prepared by using an optical floating zone melting method under high vacuum.

TABLE 1

| Steel Type | Chemical Composition (Mass %, Remainder Fe and Impurities) | | | | | | | | | | |
|---|---|---|---|---|---|---|---|---|---|---|---|
| | C | Si | Mn | P | S | Cr | Ni | Ti | Cu | Al | N |
| A | 0.027 | 0.30 | 0.29 | 0.009 | 0.002 | 30.15 | 59.75 | 0.27 | 0.02 | 0.15 | 0.0088 |
| B | 0.16* | 0.30 | 0.30 | 0.010 | 0.001 | 30.12 | 59.76 | 0.27 | 0.02 | 0.15 | 0.0088 |
| C | 0.028 | 0.30 | 0.29 | 0.009 | 0.002 | 7.8* | 59.60 | 0.27 | 0.02 | 0.15 | 0.0090 |
| D | 0.027 | 0.30 | 0.29 | 0.009 | 0.002 | 42.2* | 59.75 | 0.28 | 0.02 | 0.14 | 0.0088 |

*Outside the scope defined by the present invention

The prepared single crystal material was fixed by a jig, crystal orientations were specified by an X-ray Laue method, and then samples were prepared by cutting the single crystal material, each having a thickness of 0.5 mm, in parallel with each crystal orientation using wire-electrical discharge machining to be provided to an Ni release test and an anodic polarization resistance measurement described below.

In the Ni release test, an end surface on one side of a titanium pipe having an outer diameter of 12.7 mm×a length of 150 mm was fastened by Swagelok (registered trademark) to be capped, a test material which was cut by the wire-electrical discharge machining was input into the titanium pipe by one sample, and 1000 ppm B+2 ppm Li+30 cc H$_2$/kg H$_2$O (STP) which is nuclear reactor primary simulation water was also injected into the titanium pipe as test solution. Subsequently, an end surface on the other side of the titanium pipe was also fastened by Swagelok (registered trademark), and thus the test material and the test solution were sealed in the titanium pipe. The titanium pipe was exposed in a batch type autoclave in an environment of 325° C. for 500 hours. The test was curried out with the two samples every plane orientation. After the test, the solution in the titanium pipe was sampled, the amount of Ni was measured from the sampled solution by using an atomic absorption spectroscopy, and the amount of Ni release per unit area was obtained. A result thereof is shown in FIG. 1.

In the anodic polarization resistance measurement, a lead wire was soldered to the test material, and a metal exposed portion other than a measurement surface was insulated by being coated with silicone. As the test solution, 0.5 mol/L of Na$_2$SO$_4$ aqueous solution was used, and anodic polarization resistance was measured in an environment of a saturated atmosphere while controlling the temperature to be 35° C. As a pretreatment of the measurement, the test material was maintained at a constant potential of −1.5V (hereinafter, all potentials are indicated on the basis of a saturated Ag/AgCl electrode) for 600 seconds, and a passive film on a surface of the test material was reduced to be in a surface activated state. Subsequently, the anodic polarization resistance was measured, 10 minutes, 20 minutes, and 30 minutes after sample became open circuit state. In the anodic polarization resistance measurement, a current value was measured by polarizing the potential from open circuit potential to +10 mV at a potential sweeping rate of 2 mV/s. The measured current was converted into current density, and the anodic polarization resistance per unit area was calculated according to Ohm's law from the relationship between the current and the potential. The result thereof is shown in FIG. 2.

Figure 2:
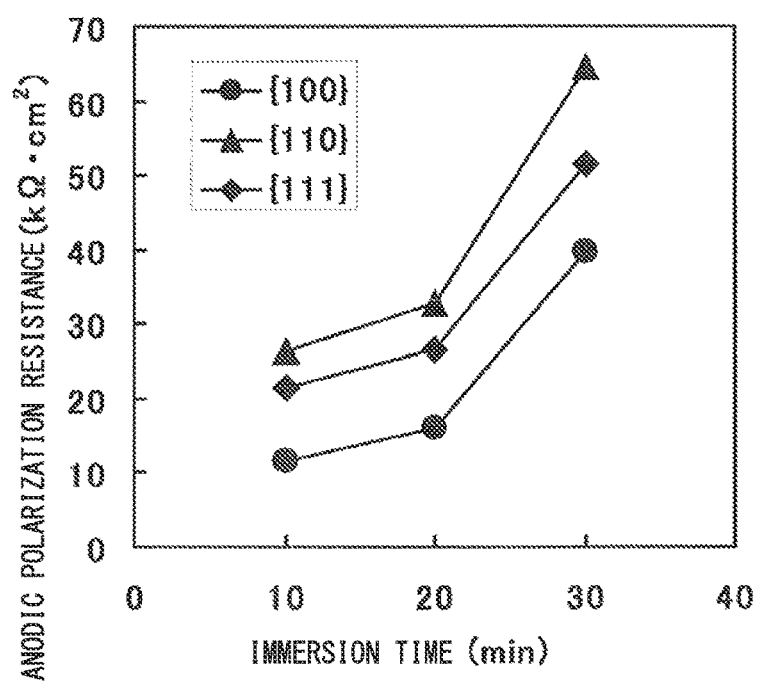
FIG. 2 is a diagram showing a relationship between an immersion time of the sample having each plane orientation and anodic polarization resistance per unit area, by an anodic polarization resistance measurement.

As shown in FIGS. 1 and 2, in the sample having the plane orientation of {110}, the amount of Ni release was small, and the anodic polarization resistance was large, compared to the sample having the plane orientation of {100} or {111}. From this result, it is obvious that general corrosion resistance of the alloy is improved when the preferred crystal orientation of {110} (a preferred crystal orientation of {220}) in a structure on a surface layer of the material increases.

Example 2

An austenitic alloy having chemical compositions shown in Table 1 was dissolved and cast in vacuum, an ingot obtained therefor was subjected to hot forging to prepare a billet, and the obtained billet was formed in the shape of a tube by a hot extrusion molding method. A tube obtained therefor was subjected to the cold rolling by a cold pilger mill in a condition where reduction of area was 60% to 91%, and the tube having an outer diameter of 25 mm and a thickness of 1.65 mm is obtained.

Next, the annealing heat treatment (an intermediate mill annealing heat treatment) was performed in a hydrogen atmosphere of 1000° C. or higher to 1200° C. or lower. Subsequently, the cold drawing was further performed at reduction of area of 27% to 55%, and after the cold drawing, the annealing heat treatment (a final mill annealing heat treatment) was performed in the hydrogen atmosphere of 1000° C. or higher to 1200° C. or lower, and thus austenitic alloy tubes (test tubes) of test Nos. 1 to 37 were prepared. Manufacturing conditions for each test No. are shown in Table 2.

TABLE 2

| Sample No. | Steel Type | Intermediate Mill Annealing | | | Final Mill Annealing | | | R Value | fl Value | $F_{111}$ (°) | Amount of Ni Release (mg/m²) | Stress Corrosion Cracking Resistance | Classification |
|---|---|---|---|---|---|---|---|---|---|---|---|---|---|
| | | Reduction of Area of Cold Rolling (%) | Heat Treatment Temperature (° C.) | Heat Treatment Time (h) | Reduction of Area of Cold Drawing (%) | Heat Treatment Temperature (° C.) | Heat Treatment Time (h) | | | | | | |
| 1 | A | 80 | 1050 | 1.0 | 45 | 1100 | 1.0 | 0.07 | 0.25 | 0.47 | <1.00 × 10⁻² | GOOD | Examples of the Present Invention |
| 2 | A | 72 | 1100 | 1.0 | 45 | 1050 | 5.7 | 0.16 | 0.26 | 0.49 | <1.00 × 10⁻² | GOOD | |
| 3 | A | 76 | 1050 | 1.0 | 45 | 1100 | 1.0 | 0.14 | 0.26 | 0.48 | 6.24 × 10⁻¹ | GOOD | |
| 4 | A | 85 | 1050 | 1.0 | 45 | 1100 | 1.0 | 0.05 | 0.22 | 0.41 | 1.75 × 10⁻¹ | GOOD | |
| 5 | A | 78 | 1050 | 1.0 | 45 | 1050 | 5.7 | 0.10 | 0.26 | 0.47 | <1.00 × 10⁻² | GOOD | |
| 6 | A | 91 | 1050 | 1.0 | 45 | 1100 | 1.0 | 0.03 | 0.06 | 0.30 | 8.21 × 10⁻¹ | GOOD | |
| 7 | A | 89 | 1100 | 0.5 | 45 | 1150 | 0.2 | 0.05 | 0.28 | 0.62 | 5.00 × 10⁻¹ | GOOD | |
| 8 | A | 65 | 1100 | 1.0 | 45 | 1100 | 1.0 | 0.16 | 0.26 | 0.50 | 4.00 × 10⁻² | GOOD | |
| 9 | A | 80 | 1050 | 1.0 | 38 | 1050 | 5.0 | 0.10 | 0.26 | 0.49 | 1.00 × 10⁻² | GOOD | |
| 10 | A | 76 | 1050 | 1.0 | 38 | 1100 | 1.0 | 0.14 | 0.26 | 0.48 | 6.24 × 10⁻¹ | GOOD | |
| 11 | A | 91 | 1150 | 0.5 | 38 | 1050 | 5.7 | 0.05 | 0.11 | 0.33 | 7.30 × 10⁻¹ | GOOD | |
| 12 | A | 65 | 1100 | 1.0 | 38 | 1100 | 1.0 | 0.20 | 0.27 | 0.51 | 9.20 × 10⁻² | GOOD | |
| 13 | A | 80 | 1100 | 0.5 | 34 | 1100 | 1.0 | 0.12 | 0.26 | 0.50 | <1.00 × 10⁻² | GOOD | |
| 14 | A | 76 | 1150 | 0.5 | 34 | 1050 | 15.7 | 0.14 | 0.26 | 0.49 | 6.25 × 10⁻¹ | GOOD | |
| 15 | A | 91 | 1050 | 1.0 | 34 | 1000 | 37.2 | 0.08 | 0.21 | 0.40 | 5.40 × 10⁻¹ | GOOD | |
| 16 | A | 65 | 1100 | 1.0 | 34 | 1150 | 0.2 | 0.23 | 0.27 | 0.54 | 7.50 × 10⁻¹ | GOOD | |
| 17 | A | 80 | 1100 | 0.5 | 27 | 1100 | 1.0 | 0.13 | 0.27 | 0.51 | <1.00 × 10⁻² | GOOD | |
| 18 | A | 76 | 1050 | 1.0 | 27 | 1100 | 1.0 | 0.14 | 0.26 | 0.48 | 6.25 × 10⁻¹ | GOOD | |
| 19 | A | 91 | 1150 | 0.5 | 27 | 1100 | 1.0 | 0.12 | 0.23 | 0.43 | 1.01 × 10⁻¹ | GOOD | |
| 20 | A | 65 | 1100 | 1.0 | 27 | 1100 | 1.0 | 0.26 | 0.27 | 0.55 | 8.54 × 10⁻¹ | GOOD | |
| 21 | A | 80 | 1050 | 1.0 | 45 | 1150 | 0.4 | 0.06 | 0.25 | 0.48 | <1.00 × 10⁻² | GOOD | |
| 22 | A | 85 | 1000 | 37.0 | 45 | 1040 | 8.2 | 0.06 | 0.20 | 0.40 | 1.60 × 10⁻¹ | GOOD | |
| 23 | A | 78 | 1020 | 2.5 | 38 | 1050 | 5.7 | 0.09 | 0.24 | 0.45 | 5.00 × 10⁻² | GOOD | |
| 24 | A | 72 | 1140 | 0.1 | 38 | 1100 | 1.0 | 0.14 | 0.25 | 0.48 | <1.00 × 10⁻² | GOOD | |
| 25 | A | 89 | 1100 | 0.2 | 34 | 1050 | 5.7 | 0.06 | 0.20 | 0.40 | <1.00 × 10⁻² | GOOD | |
| 26 | A | 85 | 1050 | 1.0 | 34 | 1020 | 17.3 | 0.05 | 0.19 | 0.39 | 1.60 × 10⁻¹ | GOOD | |
| 27 | A | 60 | 1050 | 0.5 | 45 | 1050 | 0.5 | 0.30* | 0.28 | 0.65 | 1.01 × 10 | GOOD | Comparative Examples |
| 28 | A | 80 | 1050 | 1.5 | 45 | 1200 | 1.0 | 0.06 | 0.06 | 0.30 | 3.07 | GOOD | |
| 29 | A | 69 | 1050 | 1.5 | 45 | 1200 | 1.5 | 0.20* | 0.14 | 0.35 | 6.79 | GOOD | |
| 30 | A | 70 | 1100 | 2.0 | 55 | 1050 | 0.5 | 0.12* | 0.06 | 0.30 | 8.54 | GOOD | |
| 31 | A | 85 | 1000 | 10.0 | 38 | 1200 | 5.0 | 0.15* | 0.02 | 0.25 | 6.50 | GOOD | |
| 32 | A | 72 | 900 | 10.0 | 38 | 1000 | 0.5 | 0.22* | 0.09 | 0.32 | 7.50 | GOOD | |
| 33 | A | 80 | 1100 | 1.0 | 27 | 950 | 24.0 | 0.16* | 0.08 | 0.31 | 8.20 | GOOD | |
| 34 | A | 65 | 1200 | 5.5 | 27 | 1050 | 0.3 | 0.21* | 0.09 | 0.32 | 7.40 | GOOD | |
| 35 | B | 80 | 1050 | 1.0 | Crack Occurs | — | — | — | — | —* | — | — | |
| 36 | C | 80 | 1050 | 1.0 | 38 | 1100 | 1.0 | 0.15* | 0.09 | 0.32 | 7.90 | NG | |
| 37 | D | 78 | 1050 | 1.0 | Crack Occurs | — | — | — | — | —* | — | — | |

*Outside the scope defined by the present invention

In order to straighten local bending of the manufactured test tube, the cold working was performed by the straightener in constant conditions, and then, in order to reduce local lattice strain due to the cold working, the heat treatment was performed.

A sample having a length of 30 mm was sampled from the test tube, and the sample was cut into four parts in a longitudinal direction in order to obtain a strip-shaped sample material. By using an X-ray parallel beam method, $I_{111}$ and $I_{220}$ which are the integrated intensities of {111} and {220} on the surface layer of an inner surface of the sample material described above were measured according to grazing incidence, and $I_{220}/I_{111}$ was analyzed. In addition, the full width of half maximum $F_{111}$ was analyzed from the diffraction peak of {111}. At this time, a vertical divergence limitation slit was set to 2 mm, and other slits were opened. In addition, a scanning speed was set to 0.5°/min, and a sampling interval was set to 0.02°. The depth from the surface layer was calculated from an absorption coefficient of Ni. The integrated intensity ratio in the calculated depth was adjusted by changing an incident angle of X-ray, and values of R and $F_{111}$ from the surface to a depth at or below 200 nm (from the surface to the depth of 200 nm in a tube thickness direction) were obtained.

Furthermore, as the values of R and $F_{111}$ within the surface to the depth at 200 nm, the average value of the integrated intensity ratio between {111} and {220}, and the average value of the full width of half maximum of {111} in depths of 28 nm (the incident angle: 0.1°), 56 nm (the incident angle: 0.2°), 111 nm (the incident angle: 0.4°), and 167 nm (the incident angle: 0.6°) from the surface were adopted. A result thereof is also shown in Table 2.

A test piece having a length of 2000 mm was sampled from the test tube after the heat treatment described above to be provided to the Ni release test. In the Ni release test, a circulation type autoclave was used, and 1000 ppm B+2 ppm Li+30 cc $H_2$/kg $H_2O$ (STP) which is the nuclear reactor primary simulation water flowed through the inner surface of the test tube at 300° C. for 100 hours or more. At this time, after approximately 20 hours (t1), after approximately 50 hours (t2), and after approximately 120 hours (t3), sampling was performed by flowing solution coming out from the inner surface of the test tube after approximately 1 hour through an ion exchange filter, and released Ni was sampled.

Then, the amount of Ni contained in each filter was measured by an atomic absorption spectroscopy. Then, values for which the amounts of Ni measured at the respective times of t1, t2, and t3 were divided by a sampling time at that time were set to a1, a2, and a3, respectively, and the amount of Ni release after 100 hours was obtained from "a1×t1+ a2×(t2−t1)+a3×(1.00−t2)". The results thereof are shown in Table 2 and FIG. 3.

Figure 3:
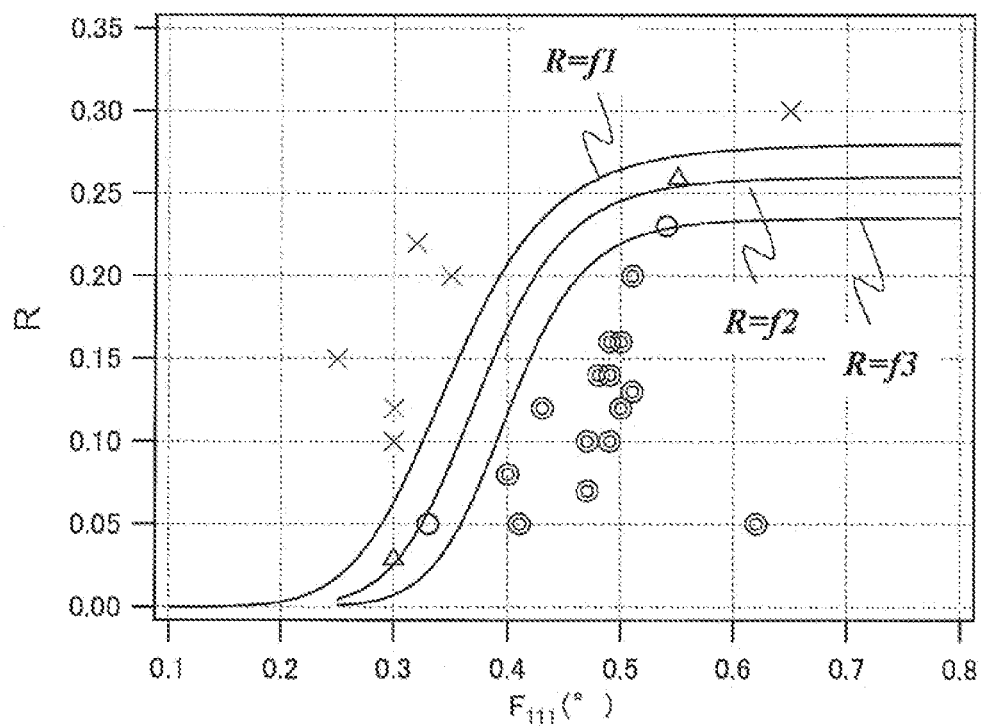
FIG. 3 is a diagram showing a relationship between a parameter R of a crystal orientation degree of {220} and $F_{111}$ that is a full width of half maximum of {111} of each of the samples in examples.

In each plot shown in FIG. 3, when the amount of Ni release was less than 0.72 mg/m$^2$, it was shown by "⊚", when the amount of Ni release was greater than or equal to 0.72 m g/m$^2$ and less than 0.80 mg/m$^2$, it was shown by "○", when the amount of Ni release was greater than or equal to 0.80 mg/m$^2$ and less than 1.00 mg/m$^2$, it was shown by "Δ", and when the amount of Ni release was greater than or equal to 1.00 mg/m$^2$, it was shown by "×".

In addition, with respect to the test tube, an evaluation of the stress corrosion cracking resistance was performed. As an evaluating method, in a PWR primary simulation water environment (360° C.), a reverse U bend test piece was used, and when a crack occurred in an SCC test for 10000 hours, it was shown by NG, and when the crack did not occur, it was shown by GOOD. The results thereof are shown in Table 2.

From FIG. 3, in the test Nos. 27 to 34, and 36 which were comparative examples that did not satisfy Expression (i) described above, the value of the amount of Ni release was large, and as a result, the general corrosion resistance was deteriorated. In contrast, in the test Nos. 1 to 26 which were examples of the present invention that satisfied Expression (i) described above, the general corrosion resistance was excellent. In addition, in the test Nos. 11 and 16 where R was less than or equal to the value of f2 represented by Expression (iv) described above, the general corrosion resistance was more excellent, and in the test Nos. 1 to 5, 7 to 10, 12 to 15, 17 to 19, and 21 to 26 where R was less than or equal to the value of f3 represented by Expression (v) described above, the general corrosion resistance was more excellent. In the test No. 35 where the C content was over the upper limit of the present invention and in the test No. 37 where the Cr content was over the upper limit of the present invention, a crack of 10 mm or greater occurred during the process. For this reason, it was not possible to perform the evaluation of the amount of Ni release and the stress corrosion cracking resistance.

In the test No. 36 where the Cr content was under the lower limit of the present invention, the amount of Ni release was large, and it was not possible to sufficiently obtain the stress corrosion cracking resistance.

INDUSTRIAL APPLICABILITY

According to the present invention, an austenitic alloy tube with high general corrosion resistance in which release of a metal component is extremely reduced even in high temperature water is obtained. Therefore, the austenitic alloy tube according to the present invention is suitable for a nuclear power plant material such as an SG tube.

The invention claimed is:

1. An austenitic alloy tube subjected to a cold working and an annealing heat treatment, comprising:
   C: 0.01% to 0.15%;
   Cr: 10.0% to 40.0%; and
   Ni: 45% to 80.0%, in mass %,
   wherein the austenitic alloy tube has a metallographic structure satisfying the following Expressions (i) to (iii), $$R \leq f1 \quad \text{(i)}$$

$$R = I_{220}/I_{111} \quad \text{(ii)}$$

$$f1 = 0.28 \times (F_{111}^{8.0}/(F_{111}^{8.0} + 0.35^{8.0})) \quad \text{(iii)}$$

where, in the above Expressions, R is a ratio of an integrated intensity of {220} to an integrated intensity of {111} on a surface layer which is measured by a grazing incidence X-ray diffraction method, $I_{220}$ is the integrated intensity of {220}, $I_{111}$ is the integrated intensity of {111}, and $F_{111}$ is full width of half maximum of {111} on the surface layer which is measured by the grazing incidence X-ray diffraction method.

2. The austenitic alloy tube according to claim 1, wherein the austenitic alloy tube is used as a nuclear power plant material.

* * * * *